Oct. 15, 1963  E. WILDHABER  3,106,765
HOB
Filed Oct. 5, 1959  2 Sheets-Sheet 1

INVENTOR:
Ernest Wildhaber

Oct. 15, 1963    E. WILDHABER    3,106,765
HOB
Filed Oct. 5, 1959    2 Sheets-Sheet 2
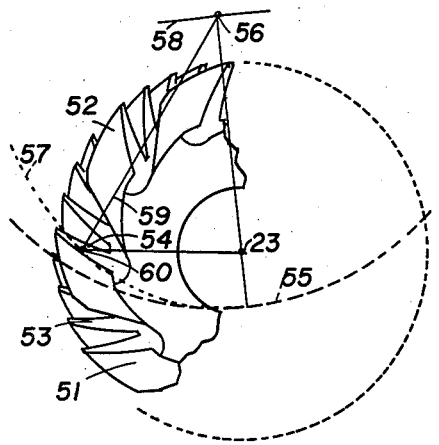
FIG. 7
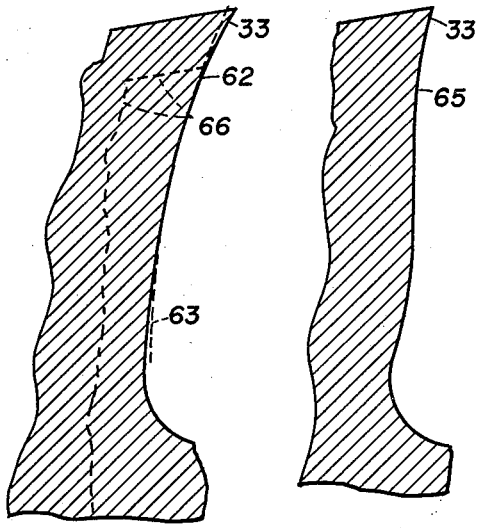
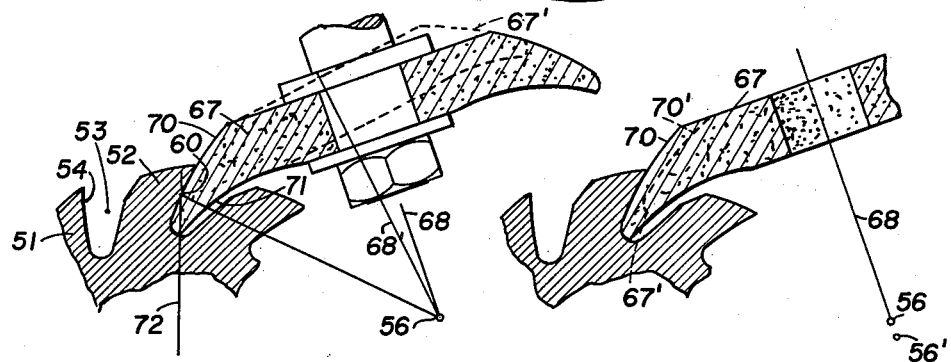
FIG. 10    FIG. 11
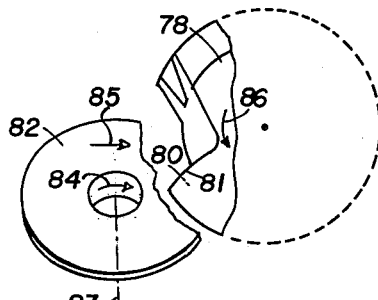
FIG. 12
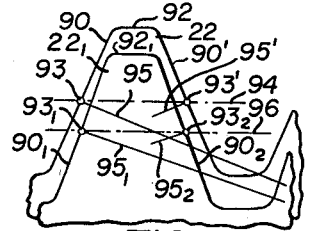
FIG. 13
INVENTOR:
Ernest Wildhaber Patented Oct. 15, 1963

3,106,765
HOB
Ernest Wildhaber, 124 Summit Drive, Brighton, N.Y.
Filed Oct. 5, 1959, Ser. No. 844,239
11 Claims. (Cl. 29—103)

The present invention relates to cylindrical hobs having cutting teeth disposed in one or more helical threads, such as are used for cutting gears, splines etc. The invention provides hobs with novel cutting faces and correspondingly altered side surfaces of the cutting teeth.

Hobs generally have straight or helical gashes whose one side surface constitutes a cutting face. The profiles of these cutting faces are straight. Commonly they are also radial of the hob axis. The radial profile has been found helpful in attaining the desired shape to be produced by the hob. Non-radial straight profiles have also been proposed to attain keener cutting edges. In prior art difficulties were had with these in attaining the required shape produced by the hob and maintaining this shape during the life of the hob.

These difficulties are overcome by applicant's inventions hereinafter referred to.

Plane cutting faces offset from the hob axis, to attain keener cutting edges, weaken the cutting teeth. Thus if a cutting face were to extend along dotted line 20 in FIG. 1, it would decrease the strength of the cutting teeth and reduce the hob life.

One object of the present invention is to provide improved cutting faces that provide keen cutting edges at the tip of the cutting teeth where the hob dulls first, while generally preserving the strength of the cutting teeth, and without weakening them in the manner described. A further object is to facilitate chip curling by providing concavely curved cutting faces on hobs.

When the cutting faces are helical, the reproduction of the given cutting surface is either time-consuming or difficult and inaccurate. This is because the helical shape produced by a grinding wheel depends on the diameter of the grinding wheel as well as on its profile. A way of generating the required wheel shape is known. But it requires a great many helical truing passes on a special fixture. Arriving at the shape by trial and error is not fast either.

A further aim of the present invention is to do away with all this extra work, by providing a helical cutting surface such as may be enveloped by a sphere whose center moves helically about the hob axis. This shape can be reproduced readily and exactly with a grinding wheel whose working surface is part of this given sphere, while the diameter of the grinding wheel may change. The side surfaces of the hob cutting teeth are relieved so as to produce the required shape with this form of cutting face.

Thus one aim is to provide hob cutting surfaces such as are envelopable by a sphere whose center moves relatively to the hob in a cylindrical surface coaxial with the hob, either parallel to the hob axis or helically about it.

Other objects will appear in the course of the specification and in the recital of the appended claims.

These objects may be attained singly or in any combination. In the drawings:

FIG. 7 is a fragmentary end view of a further hob embodying the invention and having helical cutting faces.

FIG. 8 is a fragmentary and enlarged section of a cutting tooth of a hob having helical cutting faces, the section being taken at right angles to the hob axis.

FIG. 9 is a section similar to FIG. 8, showing with exaggeration a radially directed profile of a helical cutting face envelopable by a sphere.

Figure 1:
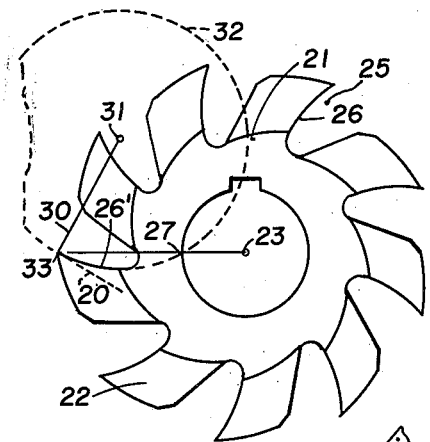
FIG. 1 is an end view of a hob constructed according to the present invention.
Figure 2:
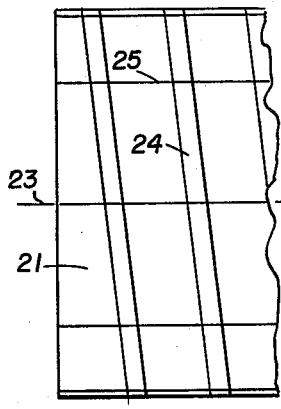
FIG. 2 is a fragmentary side view corresponding to FIG. 1 and showing very diagrammatically the outside surface of the hob.

FIGS. 10 and 11 are fragmentary normal sections laid through the hob also shown in FIG. 7 and through a grinding wheel that engages a cutting face for sharpening the hob. FIG. 10 shows a grinding wheel in two stages of its life, superimposed in grinding position. FIG. 11 shows the wheel profiles of different life stages superimposed in coaxial position.

FIG. 12 is a diagram illustrating a way of generating the profile to be used on a grinding wheel that relief-grinds the sides of the hob teeth.

FIG. 13 is a diagrammatic view showing superimposed on one another two axial sections of the thread of a hob made according to one embodiment of this invention, one axial section illustrating the positions of the cutting edges of a hob tooth when the hob is new, and the other axial section showing the positions of these cutting edges after the hob has been sharpened back considerably, the cross-hatching being omitted for clarity.

Hob 21, shown in FIGURES 1 to 5, has cuting teeth 22 helically disposed about the hob axis 23 and following one another. They are lined up in a single helical thread 24 that is traversed by gashes 25. These extend parallel to the hob axis 23 and form cutting faces 26 on the hob teeth 22.

According to the invention the cutting faces 26 have concavely curved profiles 26′ that are inclined to the radial direction 27 (FIG. 1) to effect the top rake or hook. This effects keen cutting edges especially at the tip of the cutting teeth, which is the critical portion. The cut then is smooth and takes less effort than with cutting faces of radial profile.

The cutting faces with concave profile 26′ do not materially weaken the cutting teeth, and in this respect are superior to plane cutting faces 20 (FIG. 1) that give the same top rake. Also the concave profile 26′ is favorable to chip curling, and the chips are less apt to be caught and held at the root of the cutting teeth.

The profiles 26′ are circular arcs, having a radius 30 and a center 31. Thus the cutting surface 26 is part of a cylindrical surface, and more generally, a surface such as may be enveloped by a sphere 32 whose center 31 moves axially of the hob.

When the cutting-face profiles 26′ are as sharply curved as shown, their position is preferably changed during the life of the hob, as the hob diameter changes. This change is in a predetermined way, depending on the outside diameter of the hob.

Figure 3:
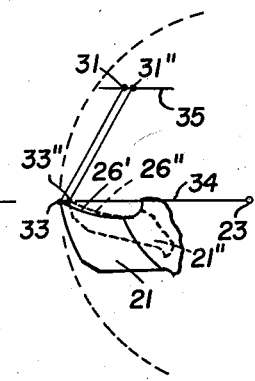
FIG. 3 is an axial view showing a cutting tooth of a hob during different life stages and illustrating the change of this type of cutting face.

FIG. 3 illustrates the change in cutting face. On a new hob 21 the arc-profile 26′ is centered at 31. Dotted lines 21″ indicate the hob when nearly used up, in a turning position about its axis 23 such that the tip 33″ of a cutting tooth lies on the same radius 34 as the tip 33 of a cutting tooth of hob 21. The profile 26″ of its cutting face is a circular arc identical with profile 26′, but displaced so that the arc center is at 31″. The profile center is displaced on a line 35 offset from the hob axis 23, displacement 31—31″ being equal to the change 33—33″ of the outside radius of the hob. The change in distance between the profile center 31, 31″ and the hob axis 23 is smaller than the change 33—33″ in hob outside radius.

This profile shift during the hob life preserves the top rake and also renders relieving less difficult. The hobs are preferably relieved so that they cut teeth or a product of constant pressure angle or profile inclination throughout their life. A relieving procedure to this end is fully described in my patent application "Method of Relieving Hobs," filed November 2, 1959, Serial No. 850,141, and in my application "Hob," filed June 8, 1954, Serial No. 435,260, now Patent No. 2,916,803, granted December 15, 1959.

The cutting edges of a hob lie in one or more continuous helical threads. The lead of the hob thread remains constant during the hob life, while the hob diameter changes. It has been demonstrated in the above-named applications that the profile inclination of the hob thread should decrease as the hob diameter decreases, to enable the hob to cut a constant product. This can be accomplished with a modified direction of the relieving motion, which is offset from the hob axis.

FIG. 13 illustrates how the profile inclination of the side surfaces of the hob teeth decreases as the hob diameter decreases. Here opposite side profiles of a hob tooth 22 are denoted at 90 and 90′, when the hob is new and at $90_1$ and $90_2$ when the hob has been sharpened back considerably. Due to the relief, the top profile of the hob tooth after sharpening has assumed the position $90_1$ as contrasted with the original position 90 of the top cutting edge of the hob tooth. Points 93, 93′ are mean profile points on the original side cutting edges 90, 90′ of the hob tooth. The points 93, 93′ lie on the pitch surface 94 of the hob. Since the hob and the workpiece in the cutting operation turn at a constant ratio, and since their velocity component in the direction of the surface normal is equal at a point of contact, the thread and the workpiece have the same pitch in the direction of the surface normal, that is, the same normal base pitch. Accordingly, if the points $93_1$, $93_2$ of the hob tooth after it has been sharpened and has the profile $22_1$, are to produce the same points on the profile of the workpiece as are produced by the points 93, 93′ of the hob tooth when it is new, the normal base pitch at points $93_1$, $93_2$ should be the same as at points 93, 93′. Profiles $90_1$ and $90_2$ are identical with profiles 90 and 90′, respectively, and are only displaced with respect to profiles 90 and 90′ in the direction of the thread axis. Points $93_1$ and $93_2$ lie on a line 96 which coincides approximately with the pitch line 94 when the hob is advanced radially to mesh with the workpiece. The normal 95 at point 93 has the same inclination as the normal $95_1$ at point $93_1$; and the normal $95_2$ at point $93_2$ has the same inclination as the normal 95′ at point 93′. The normal $95_1$ is, however, inclined to normal 95 and defines a decreased profile inclination or pressure angle. Likewise the normal $95_2$ is inclined to the normal 95′ and defines a decreased profile inclination of the side of the hob tooth, that is, a decreased pressure angle.

The different shape of the cutting face also requires a different shape of the relieving tool, to produce hobs to cut a given product. A procedure of generating this shape will be outlined hereafter.

Figure 4:
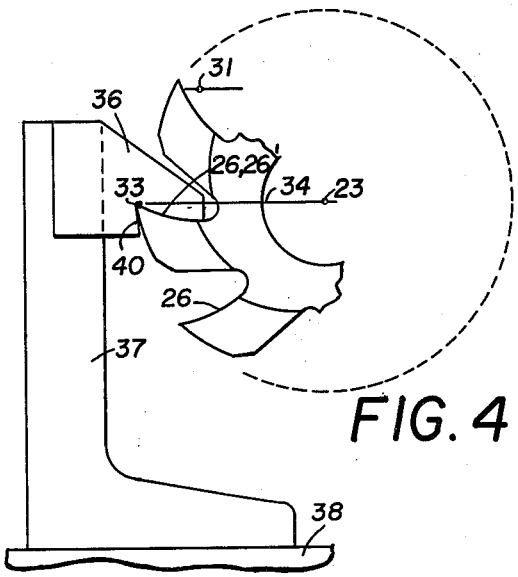
FIG. 4 is a fragmentary end view of the hob also shown in FIG. 1, set up for checking its cutting faces.

A way of checking the curved cutting face 26 will now be described with FIG. 4. A gage 36 is rigidly secured to a support 37 that is movable on a base 38 in a direction parallel to radius 34. The desired profile center 31 has a fixed position with respect to the tip 33 of a cutting tooth at all stages of the hob life. The gage 36 has a convex profile that matches the desired concave profile 26′ of cutting face 26 and that has the same profile center 31. This center is kept in the given fixed position with respect to tip 33 by a stop portion 40 that is part of gage 36 and that is kept in contact with tip 33. Accordingly the cutting face 26 has the correct profile when it fits the gage, at all stages of the hob life.

Figure 5:
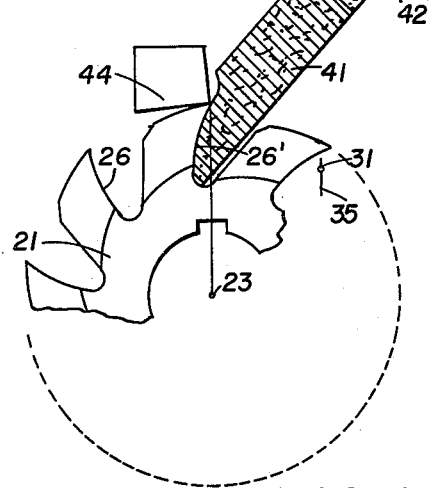
FIG. 5 is a fragmentary end view of the same hob, shown in engagement with a grinding wheel and illustrating a way of sharpening the hob.

A way of sharpening hob 21 is indicated in FIG. 5. A grinding wheel 41 rotates on an axis 42. Its working profile matches the arc profile 26′ desired on cutting face 26 and centered at 31. Reciprocation along the hob axis 23 is effected between the hob 21 and the grinding wheel 41, so that the grinding wheel sweeps the entire length of the cutting face. The hob is indexed after one or more strokes to engage other cutting faces with the grinding wheel.

The position of the arc center 31 on line 35 depends on the outside radius of the hob. Before sharpening, the grinding wheel carrier is vertically adjusted until a stop 44 contacts the hob, while the grinding wheel is axially out of reach of the hob. Stop 44 is adjustable with the grinding wheel carrier. It is swung out of position before sharpening starts.

To grind off more stock from the cutting faces, the hob is slightly turned on its axis, and the grinding wheel carrier is lowered in proportion thereto.

Figure 6:
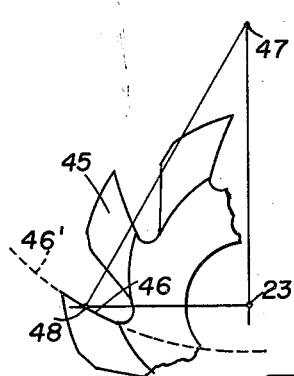
FIG. 6 is a fragmentary end view of a hob having a modified form of cutting face.

While arc profile 26′ has a radius 30 (FIG. 1) smaller than the outside radius 23–33 of the hob 21, the hob 45 shown in FIG. 6 has cutting faces 46 whose profile 46′ is curved less. This profile is a circular arc centered at 47. It represents the curvature circle, at means point 48, of a logarithmic spiral, the spiral that has a constant inclination to all radial directions.

With such moderately curved profiles the profile center 47 is preferably kept at a constant distance from the hob axis 23 during the entire hob life.

*Helical Gashes*

The hob 51 shown in FIG. 7 has cutting teeth 52 disposed in multiple helical threads, of left hand. These are traversed by helical gashes 53 forming cutting faces 54. These are here also surfaces envelopable by a sphere, 55, whose center 56 moves helically along and about the hob axis 23 at the given lead of the gashes. Center 56 lies on the surface normal 59 at mean point 60 of the cutting face; and the full length of projected distance 56–60 equals the sphere radius. It is larger than the outside radius of the hob.

A sphere 55 is known to contact the enveloped surface 54 in a great circle 57 whose plane is perpendicular to the path of the sphere center. It is perpendicular to the helix described by the sphere center 56 and to the helix tangent 58 at point 56. For sharpening, the sphere 55 is embodied as a grinding wheel. The portion of circle 57 within the boundaries of the cutting face is the line of grinding contact. This line extends obliquely across the cutting face. It is inclined to the depthwise direction of the cutting teeth, and to planes at right angles to the hob axis.

To better point out the invention within a limited drawing space a sphere smaller than preferably used is shown in FIGS. 7, 10, 11, and the characteristics are shown exaggerated in FIGS. 8 and 9.

While the profile of the helical cutting face is circular in planes inclined to the depthwise direction of the cutting teeth, it is not circular and has a varying curvature in sections at right angles to the hob axis.

FIG. 8 illustrates such a section through a helical cutting face that is envelopable by a sphere. The sectional profile 62 has a mean curvature corresponding to a circle 63, shown in dotted lines. It is more curved than circle 63 adjacent the tip 33, where profile 62 reaches beyond the circle. It is less curved adjacent the tooth root, where it recedes from the circle. Its profile curvature changes continuously from the bottom to the tip 33 of the cutting teeth.

FIG. 9 illustrates this characteristic of a helical cutting face envelopable by a sphere on a cutting-face profile 65 that is essentially straight in the middle portion. It is a curve of S-shape, with a point of inflection in the middle portion. Again the tip 33 stands out and the root recedes. The profile curvature changes continuously from the tooth bottom to the tip.

The dotted lines 66 shown in FIG. 8 represent a cutting tooth at a later stage of the hob life. The cutting-face profile remains identical with profile 62, except for the boundaries at the tip and bottom. The profile 62 and its position with respect to the hob axis, and the helical cutting surface itself, remain unchanged and independent of the hob outside diameter.

In FIG. 10 a grinding wheel 67 is shown in engagement with a cutting face 54 of hob 51. Contact in this normal section is at mean point 60 only, the grinding profile clearing the sectional profile of the cutting face on both sides of point 60 by small amounts not visible in the drawing. The axis 68 of wheel 67 passes through the sphere center 56, and its grinding surface 70 is part of the sphere 55. The wheel 67 may have a slight cup-shape, as shown. The side 71 opposite the grinding surface has preferably a concave profile and is at a sufficient distance from the gash profile to clear the rear of the helical cutting teeth.

Wheel 67 is set about an axis 72 to an angular position corresponding to the helix angle at mean point 60. However other helix angle positions are also feasible, as long as the sphere center 56 has the required distance from the hob axis. Also the whole assembly might be turned about the hob axis if desired.

Dotted lines 67' show the outline of the grinding wheel after it has been gradually dressed down to a smaller diameter. It is shown superimposed in grinding position to the original wheel 67. For clarity cross-hatching has been omitted on wheel 67 in FIGS. 10 and 11.

The axis 68' of wheel 67' continues to pass through center 56. As compared with the original position the wheel 67' is angularly displaced about an axis perpendicular to the drawing plane of FIG. 10 and passing through the sphere center 56. This axis is also parallel to the peripheral direction of the grinding wheel at the mean point 60 of grinding engagement. In addition the wheel 67' is advanced along its axis 68'.

The sharpening operation itself is the same as for straight gashes, except that a helical motion along and about the hob axis is used instead of a straight motion parallel to the hob axis.

FIG. 11 shows the shape of wheel 67' superimposed to that of wheel 67 in coaxial relationship. The grinding surface 70' lies closer to the wheel axis and stands back of the original grinding surface 70. Spherical surface 70' is centered at 56' at a distance 56—56' from center 56. Center 56' coincides with center 56 when wheel 67' is in grinding position.

The described sharpening process with angular adjustment of the grinding wheel is also applicable to non-spherical grinding surfaces. Here also the grinding wheel is preferably tilted about an axis intersecting the wheel axis at the point where the surface normal 59 at the mean point of engagement 60 intersects the wheel axis. Here also the wheel is advanced axially for truing.

When sharpening helical surfaces in this way, a constant wheel profile produces a constant profile curvature on the cutting face, even though the wheel diameter changes.

Relieving

While at present a radial relieving motion is generally employed I preferably use a relieving motion offset from the hob axis, as already stated. After the direction and the amount of the relieving motion is known we have to determine the shape of the relieving tool, as for instance that of a grinding wheel.

This will now be described with FIG. 12, which refers to a right hand hob with multiple threads.

An unrelieved master 78 is made that has the continuous thread corresponding to a mean life stage of the hob. The cutting edges required on the hob at this life stage are the intersections of this thread with the known cutting faces. Instead of cutting faces as they are on the hob we apply to the unrelieved master 78 a cutting face 80 that is the exact counterpart of the cutting face used on the hob. The surface is the same, but with the metal on the opposite side. On the master 78 the metal is below the counterpart cutting face 80, and it is above the cutting face on the hob. Because the intersecting surface is the same as on the hob, the intersection also produces the correct cutting edge 81.

The master 78 is then set up on the relieving machine in the exact place of the hob. A dummy wheel 82, shaped like the grinding wheel but slightly oversize, is placed in the exact position of the grinding wheel. It is made of a material suitable for cutting. It is rotated on its axis 83 towards face 80, in the direction of arrow 84. Exactly the same motions are provided between wheel 82 and the master 78 as between the grinding wheel and the hob, but at a very slow rate except for the wheel rotation. Hereby wheel 82 moves in the direction of arrow 85 while the master 78 turns in the direction of arrow 86. Thereby edge 81 generates a surface of revolution on wheel 82 in a fraction of a single relieving stroke. This surface is the same surface as required on the grinding wheel for producing the correct cutting edge 81 and the relieved side surface of the cutting teeth. It is duplicated on the grinding wheel. To dress or true, the grinding wheel is advanced axially. For further details reference is made to my aforesaid application "Method of Relieving Hobs."

The same procedure also applies to generating the cutting edge of a relief-cutting tool, if required. Here, however, the motions should be reversed, the dummy tool moving in a direction opposite to arrow 85 and the master 78 turning in a direction opposite to arrow 86, to effect cutting.

While the invention has been described in connection with several different embodiments thereof, it is capable of further modifications, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

I claim:

1. A rotary cylindrical hob having cutting teeth helically disposed about the hob axis and following one another, gashes traversing said cutting teeth and forming cutting faces thereon, each of said cutting faces having a concavely curved profile in a plane perpendicular to the hob axis, said profile extending from the top of each cutting tooth toward its root and being inclined to the outside radius of the hob to effect top rake, the intersections of said cutting faces with the side surfaces of said cutting teeth constituting the original side cutting edges of the hob teeth, said side surfaces being relieved back of their cutting faces and having a profile inclination decreasing from front to rear, whereby surfaces, which are identical with said cutting faces but which are displaced therefrom about the hob axis, intersect said side surfaces in lines that have a profile inclination decreasing with increasing distance from the original side cutting edges and which constitute successive side cutting edges of the hob as the hob is sharpened, so as to cut a constant tooth shape on work pieces throughout the life of the hob.

2. A rotary cylindrical hob having cutting teeth helically disposed about the hob axis and following one another, straight gashes parallel to the hob axis traversing said cutting teeth and forming cutting faces thereon which extend from the tops of said cutting teeth toward their roots, each of said cutting faces having a circular arc profile that is concavely curved and that is inclined to the outside radius of the hob, the intersections of said cutting faces with the side surfaces of said cutting teeth constituting the original side cutting edges of the hob teeth, said side surfaces being relieved back of their cutting faces and having a profile inclination decreasing from front to rear, whereby surfaces, which are identical with said cutting faces but which are displaced therefrom about the hob axis, intersect said side surfaces in lines that have a profile inclination decreasing with increasing distance from the original side cutting edges and which constitute successive side cutting edges of the hob as the hob is sharpened, so as to cut a constant tooth shape on workpieces throughout the life of the hob.

3. A rotary cylindrical hob having cutting teeth helically disposed about the hob axis and following one another, straight gashes parallel to the hob axis traversing said cutting teeth and forming cutting faces thereon, each of said cutting faces having a concave circular arcuate profile in a plane perpendicular to the hob axis, the top surfaces of said teeth being relieved back of their cutting faces so that the hob decreases in diameter during its life, the intersections of said cutting faces with the side surfaces of said cutting teeth constituting the side cutting edges of the hob teeth, said side surfaces being relieved back of their cutting faces and having a profile inclination decreasing from front to rear, surfaces, which are identical with said cutting faces but which have profile centers that are displaced from the center of the concave circular arcuate profile of each cutting tooth about the hob axis and radially of said hob axis in proportion to their angular displacement, intersecting said side surfaces in lines which have a profile inclination decreasing with increasing distance from the original side cutting edges and which constitute successive side cutting edges of the hob as the hob is is sharpened, whereby the hob cuts a constant tooth shape on workpieces through its life.

4. A cylindrical hob according to claim 3, wherein the distance of said profile centers from the hob axis decreases at a slower rate than the radius of the top surfaces of the hob teeth.

5. A cylindrical hob according to claim 4, wherein said profile centers are displaced in a direction offset from the hob axis a distance equal to the decrease in the radius of the top surfaces of the hob teeth.

6. A rotary cylindrical hob having cutting teeth helically disposed about the hob axis and following one another, helical gashes traversing said cutting teeth and forming cutting faces thereon, the profile of each of said cutting faces in a plane perpendicular to the hob axis having a curvature changing continuously from the bottom to the tip of the cutting teeth but having a circular arcuate shape in a section inclined to said plane.

7. A cylindrical hob according to claim 6, wherein the profile of each cutting face in a plane perpendicular to the hob axis is concavely curved and is increasingly curved from the bottom to the tip of each cutting tooth.

8. A cylindrical hob according to claim 2, wherein the radius of the circular arc profile is smaller than the outside radius of the hob.

9. A rotatable cylindrical hob having cutting teeth helically disposed about the hob axis and following one another, gashes traversing said cutting teeth and forming cutting faces thereon that extend from the tops of the cutting teeth toward their roots, each of said gashes being of concave profile at one side so that said cutting faces are of concave profile, said cutting faces being arranged along a center line lying in a cylindrical surface coaxial with the hob, said cutting faces being of circular arcuate profile in plane sections perpendicular to said center line, the intersections of said cutting faces with the side surfaces of said cutting teeth constituting the original side cutting edges of the hob teeth, the side surfaces of said hob teeth being relieved back of their cutting faces and having a profile inclination decreasing from front to rear, whereby surfaces, which are identical with said cutting faces but displaced therefrom about the hob axis, intersect said side surfaces in lines which have a profile inclination decreasing with increasing distance from the original side cutting edges of the hob and which constitute succeeding side cutting edges of the hob as the hob is sharpened, so that the hob will cut a constant tooth shape on workpieces throughout its life.

10. A rotary cylindrical hob having cutting teeth helically disposed about the hob axis and following one another, helical gashes traversing said cutting teeth and forming cutting faces thereon which extend from the tops of said cutting teeth towards their roots, each of said cutting faces being a helical surface envelopable by a sphere whose center describes a helical center line about the hob axis, so that said cutting faces have a constant circular-arc profile in planes perpendicular to said center line, said circular-arc profile being inclined to the depthwise direction of said cutting teeth.

11. A cylindrical hob according to claim 10, wherein the radius of said circular-arc profile is larger than the outside radius of the hob.

References Cited in the file of this patent

UNITED STATES PATENTS

| | | |
|---|---|---|
| 1,021,868 | Hartness | Apr. 2, 1912 |
| 1,136,085 | Backert | Apr. 20, 1915 |
| 1,309,232 | Ahond | July 8, 1919 |
| 1,480,610 | Harten | Jan. 15, 1924 |
| 1,547,559 | Buckingham | July 28, 1925 |
| 1,596,978 | Klopstock | Aug. 24, 1926 |
| 1,667,299 | Wildhaber | Apr. 24, 1928 |
| 1,772,635 | Olson | Aug. 12, 1930 |
| 1,787,590 | Olson | Jan. 6, 1931 |
| 1,899,212 | Shortell | Feb. 28, 1933 |
| 1,945,535 | Schlitz | Feb. 6, 1934 |
| 2,241,703 | Gommel | May 13, 1941 |
| 2,246,503 | Carlsen | June 24, 1941 |
| 2,258,849 | Erhardt | Oct. 14, 1941 |
| 2,278,576 | Wildhaber | Apr. 7, 1942 |
| 2,324,003 | Kitchen | July 13, 1943 |
| 2,392,001 | Raper | Jan. 1, 1946 |
| 2,392,481 | Kaplan | Jan. 8, 1946 |
| 2,415,271 | Bauman | Feb. 4, 1947 |
| 2,864,153 | Mahan | Dec. 16, 1958 |
| 2,869,218 | Linder | Jan. 20, 1959 |

FOREIGN PATENTS

| | | |
|---|---|---|
| 110,975 | Switzerland | July 16, 1925 |